(12) United States Patent
Wessberg

(10) Patent No.: US 6,708,740 B2
(45) Date of Patent: Mar. 23, 2004

(54) METHOD WHEN TANKING UP USING A TANKING UP VALVE

(76) Inventor: Kaj Wessberg, Sjökvarns Gård, SE-361 00 Emmaboda (SE)

(*) Notice: Subject to any disclaimer, the term of this patent is extended or adjusted under 35 U.S.C. 154(b) by 0 days.

(21) Appl. No.: 10/257,104

(22) PCT Filed: Apr. 3, 2001

(86) PCT No.: PCT/SE01/00722
§ 371 (c)(1),
(2), (4) Date: Mar. 11, 2003

(87) PCT Pub. No.: WO01/77005
PCT Pub. Date: Oct. 18, 2001

(65) Prior Publication Data
US 2003/0159755 A1 Aug. 28, 2003

(30) Foreign Application Priority Data
Apr. 7, 2000 (SE) .............................. 00013243

(51) Int. Cl.⁷ ................................. B65B 1/04
(52) U.S. Cl. ................ 141/301; 141/351; 141/383; 137/614.04
(58) Field of Search ................. 141/301, 302, 141/348–351, 383–386; 137/613–614.21

(56) References Cited

U.S. PATENT DOCUMENTS

| | | | |
|---|---|---|---|
| 3,635,264 A | 1/1972 | Milburn | 141/291 |
| 4,958,668 A | 9/1990 | Vachon | 141/291 |
| 4,998,560 A | 3/1991 | Le Devehat | 137/616 |
| 5,694,991 A * | 12/1997 | Harris et al. | 141/346 |
| 6,079,444 A * | 6/2000 | Harris et al. | 137/614.03 |
| 6,463,957 B1 * | 10/2002 | Ozawa | 137/614.04 |

FOREIGN PATENT DOCUMENTS

| WO | 9728083 | 8/1997 |
|---|---|---|

* cited by examiner

*Primary Examiner*—Steven O. Douglas
(74) *Attorney, Agent, or Firm*—Ostrolenk, Faber, Gerb & Soffen, LLP

(57) ABSTRACT

The invention refers to a method at tanking up or refilling fuel to motor driven equipment and vehicles via at least one tanking valve (1), consisting of at least one female part (2) and at least one male part (3). The refilling is performed in at least one step 2, at which at least one tightening surface (21) creates a closed room, including at least one equipment tank (6) and one refilling outfit (7) and said intermediate, open tanking valve (1).

7 Claims, 3 Drawing Sheets

METHOD WHEN TANKING UP USING A TANKING UP VALVE

Figure 1:
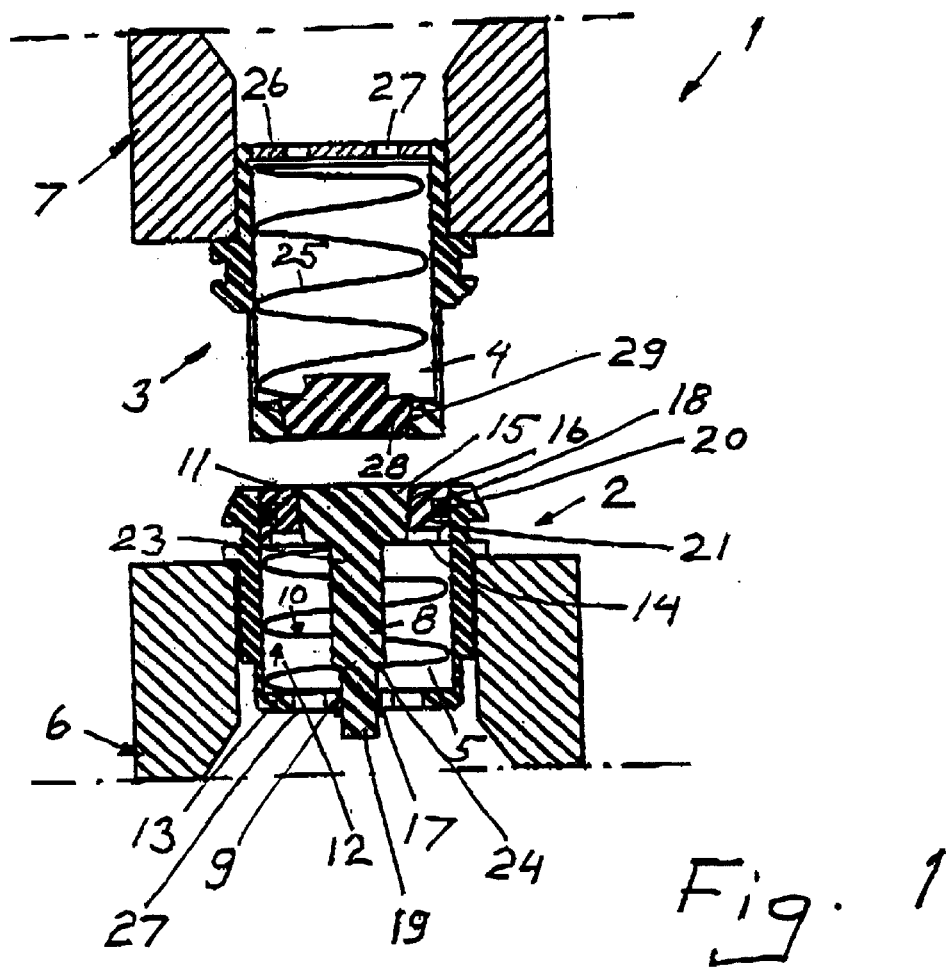

The invention relates to a valve for a closed procedure at tanking up or refilling for instance motor driven equipment for wood and garden and vehicles to make the refilling easier and this in such a way that no gas and/or fuel leaks out in the surroundings.

As the refilling outfits to be found in the market in this category are today open arrangements for refilling motor driven equipment and vehicles. The common procedure at refilling is just to let the fuel flow into the equipment tank from the refilling outfit. This refilling outfit is then put into the open hole of the equipment tank without creating a tight connection against the equipment tank so that a leakage of fuel and hazardous chemical waste and inflammable gases during the refilling are created. However in order to reduce this leakage today simplier solutions are used, especially when refilling power saws, and here a male part of the tanking device is inserted into a female part of the equipment tank. When connecting these parts together a stop in the tanking device is pushed into the equipment tank so that a valve is opened. In this case the male and female parts do not tighten against each other so that gases and fuel leaks out. This tanking device is furthermore very big and unwieldy and take too much space e.g. a motor saw or a clearing up equipment, so that its female or male part can fasten at cloths or something else around during use, so that irritation and waste of time arise. Further this tanking device only permits a slow refilling, since the gases from the equipment tank are pressed out from the female part to the surrounding air at the same time as the refilling takes place. These leaking gases also may create injuries to the user's breathing organ and lungs along with the danger of fire and the environment problems which also arise.

An object of the present invention is to eliminate these disadvantages which exist at the refilling devices stated above. According to the invention a tanking valve has been constructed, which creates a totally closed room between the refilling outfit and the equipment tank. The function is, that when refilling, the gases in the equipment tank change place with the fuel from the refilling outfit without any leakage of gases or fuel.

Thanks to the invention a tanking valve is provided, which consists of a male part and a female part. The male part is located to the refilling outfit and the female part is located to the equipment tank. The male part can with simple grips be connected to different kinds of couplings and screw-threads, which are to be found on different types of refilling outfits and closes by that totally tight against the refilling outfit. The female part is furnished with an intermediate packing against the refilling outfit. The male part shows a house, including a male part spring, pressing a lid in the front against a lid stop, so that said lid closes tightly to the lid stop. This uncomplicated construction does not take up much place. The female part also shows a house, including a female part spring and a piston, showing a covering part. Between the covering part, located nearest to the outside air in the house there is a slide, movable applied to the cover part, via a radial coned side, allowing the slide and the cover part only to be separated in one direction, as the female part presses against the slide and pushes the cover part forwards. The female part shows a mainly flat surface to the spectator, when it is closed. The slide shows a recess, creating a resting surface towards the interior of the house, because of the upper fixation of the female part which also spares room, so that the female part does not take too much place in the equipment tank. The slide shows also a groove with a radial extension so that an O-ring, which tightens between the house and the slide against a tightening-surface, is steered and fixed in the groove. The piston fits in a guiding hole towards the bottom of the house, where it is movably located and locked outside the bottom of the house with a locking device. During a pressure by the male part against the slide and the cover part these can together be moved a short first distance, as the first part of the piston is thinner than the guiding hole, whereupon the piston gets wider than the guiding hole closer to the cover part and then get a continued movement prevented against a piston stop. At refilling in a step 1, the male part is pressed into the female part, at which the lid presses against the cover part and/or the slide, which are then tightly connected together this first length, at which these are pressed down in the female part until the piston stops. In this phase the tanking valve is still quite tight. The tightening surface is here of use between the male part and the female part, as this tightening surface is located at the inside of the female part and the outside of the male part, which touch each other. The tightening surfaces help the user to guide the male part into the female part and to create a tight connection at continued movement before the tanking valve has been opened. With other words you have in this phase three tightenings as follows: Between the slide and the cover part, between the lid and the lid stop and at said tightening surfaces. In the beginning of step 2, the male part is pressed deeper into the female part, whereby the slide is set free from the cover part since the piston has stopped against the piston stop, so that a contact is created between the refilling outfit and the equipment tank, at which a joined tight room of these two spaces is created. When the male part, during finishing of step 2, reaches the bottom in the female part, a maximal opening is established, at which the fuel flows down into the equipment tank during simultaneous exchange of gas in stead of fuel in respective tank, so that practically no leakage is caused, neither of fuel, nor of gas. The equipment tanking is completed very quickly as the gas presses the fuel, that, in turn presses the gas in the closed system. When the tanking is finished the male part is pulled out of the female part, at which the slide and the cover part again are tight by taking the position they had, when step 1 was finished. The male part and the female part are now closed again at the same time as the tightening surfaces tighten again. At last, male part and female part are separated whereby the refilling is finished. In order to make the tanking up further easier a connecting spring is used, which connects the male part with the female part during step 2, with the result that the user does not have to observe the refilling process. Instead the user can rest or do something else. According to the invention there is now created a system having a tanking valve, which is not bulky, friendly to the environment, healthy and practical and by which a quicker tanking can be made.

Figure 2:
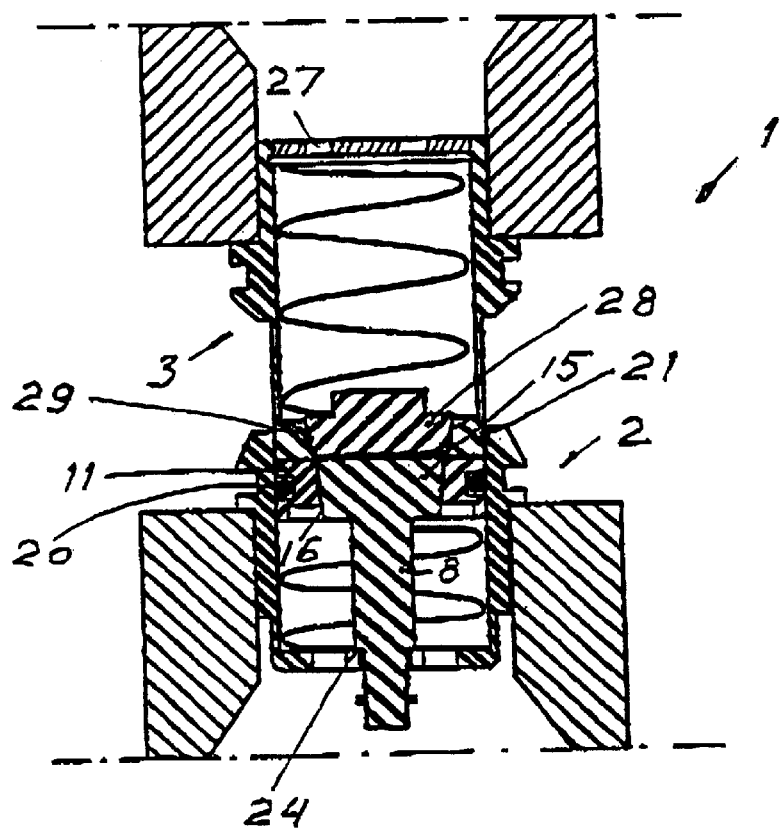
Figure 3:
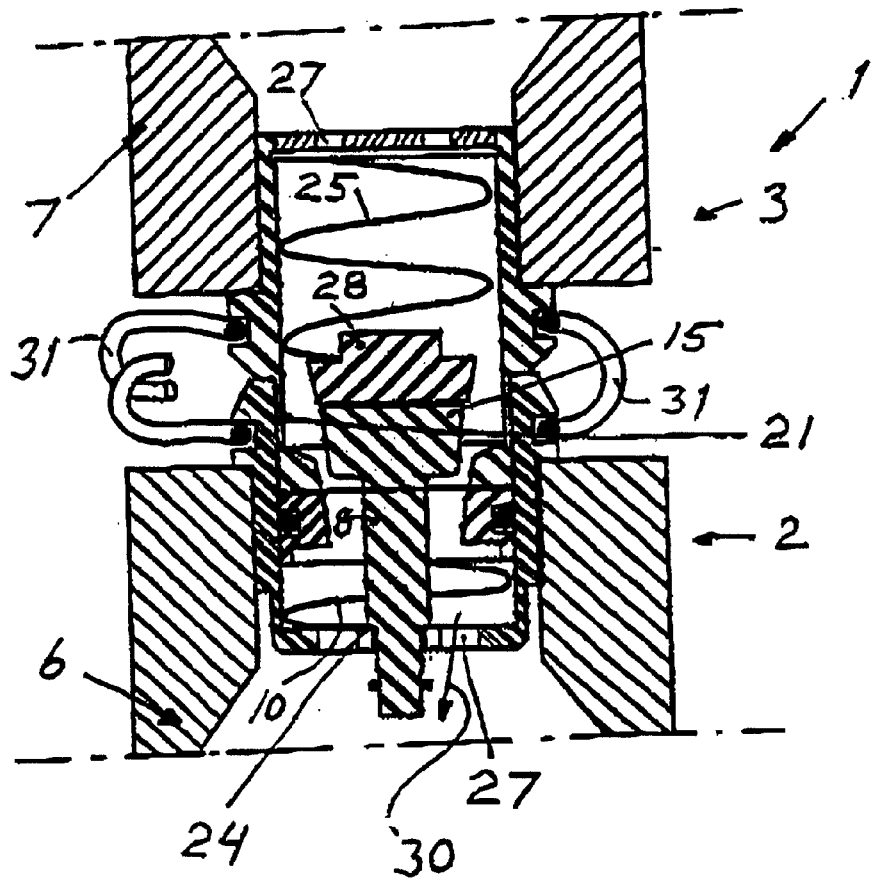

The invention is further described by help of some functional examples with reference to the drawings, on which FIG. 1 shows a refilling valve according to the invention in cross-section before refilling, FIG. 2 shows a part of a refilling valve according to the invention in cross-section during step 1 in the finishing phase and FIG. 3 shows a part of a refilling valve according to the invention in cross-section in step 2.

As can be seen in more detail of the embodiment form of the invention illustrated in FIG. 1, a refilling valve 1 comprises a female part 2, which is mounted at a equipment tank 6 and a male part 3, which is mounted in a refilling outfit 7 before a step 1 starts with each of houses 4 and 5. In the house 5 a piston 8 is movably fixed in a guiding hole 9, which in turn is fixed with a fixing part 17. Around the piston 8, having a cover part 15, a female spring 10 is pressing, which has its first tension point in the bottom of the house 13 and a second tension point in an upper rest surface 14, which is located in a slide 11, so that the female spring 10 presses the slide 11 in a direction according to an arrow 12. Since the cover part 15 and the slide 11 show a radial coned side 16, the cover part follows in the same direction, as said arrow 12. The piston 8 shows a wider part 23 and a thinner part 19, which only makes it possible for the piston to be pressed down to a point, where a piston stop 24 meets the bottom of the house 13. The slide 11 comprises a radial groove 18 around the same. In this groove 18 an O-ring is placed and tightens against a tightening surface 21. In the bottom of the house 13 there is a flowing hole 27, where fuel and gas can flow through. The male part 3 shows a male part spring 25, which has its one tension point against for instance a tension slide or against the bottom 26 of the house 4, which also has flowing holes 27 or just one big hole and its second tension point against the lid 28, which is tighten against the lid stop 29.

More closely the function appears of the embodiment example illustrated in FIG. 2, where the tanking system 1 is shown in the finish phase of step 1, when the male part 3 is pressed into the female part 2 against the slide 11 and the cover part 15, at which the piston 8 touches the piston stop 24, before the slide 11 has been uncovered from the cover part 15, when the radial coned side 16 also is still tightening. The tightening surfaces 21 are tightening at the opening of the valve 1, as the lid 28 moves towards the lid stop 29. The O-ring is always tightening.

As can be seen more closely of the function of embodiment example illustrated in FIG. 3, the tanking system 1 is shown in step 2, when the piston 8 is quite at the bottom, where it has stopped against the piston stop 24 and via the cover part 15, has pressed up the lid 28 into the male part 3 in an open position, so that the fuel flows down into the female part 2 and then through the flowing holes 27 in a direction according to an arrow 30 and further into the equipment tank 6. At the same time the tightening surfaces 21 are tightening better when having a wider contact surface, and by that a closed room has been established between the equipment tank 6 and the refilling outfit 7. To make the tanking up easier and not have to hold out against the pressure the male part spring 25 and the female part spring 10 create, a coupling spring 31 is used, which unloads this pressure during the refilling procedure.

What is claimed is:

1. A tanking valve consisting of a female part and a male part, the refilling being performed in at least two steps at the same time as a closed room is formed by tightening surfaces on said female and male parts between an equipment tank and a refilling outfit before the opening of said tanking valve, characterized in that said female part comprises a cover part provided with a piston, said cover part is tightly cooperating with an adjacent slide located outside said cover part, and that said male part comprises a lid, said lid and slide with belonging cover part are biased by springs towards their free end portions during a first step, while during a second step said slide and said cover part are separateable from each other first after that said male part is pressing in said slide a predetermined distance into said female part, the biased lid being pressed into said male part by said cover part during stopping of said piston against an end piston stop and during a further proceeding of the second step both said slide and said lid are free so that the fuel can flow through said tank valve.

2. A tanking valve according to claim 1, characterized in that said piston comprises an outer, thinner part, which is arranged during the first step to be guided in a guiding hole in the bottom of the house of the female part at the same time as said slide and said cover part are tightening against each other.

3. A tanking valve according to claim 1, characterized in that the biased lid of said male part is during the first step pressed against the biased slide of said female part with belonging cover part without these being separateable from each other.

4. A tanking valve according to claim 1, characterized in that said piston is movably attached to a fixing part of said female part next to said guiding hole.

5. A tanking valve according to claim 1, characterized in that said slide comprises at least one radial groove to accommodate an O-ring, which tightens against the female tightening surface.

6. A tanking valve according to claim 1, characterized in that the lid is closed before the second step starts by that the same is spring biased for tighten against an end lid stop.

7. A tanking valve according to claim 1, characterized in that at least one coupling spring during a part of the first step and/or the second step keeps the male part and the female part together.

* * * * *